US007776370B2

(12) United States Patent
Dias et al.

(10) Patent No.: US 7,776,370 B2
(45) Date of Patent: Aug. 17, 2010

(54) HEAT-STABLE FLAVORING COMPONENTS AND CHEESE FLAVORING SYSTEMS INCORPORATING THEM

(75) Inventors: Benjamin Emanuel Dias, Chicago, IL (US); Jimbay Peter Loh, Green Oaks, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 1021 days.

(21) Appl. No.: 11/217,830

(22) Filed: Sep. 1, 2005

(65) Prior Publication Data

US 2007/0048404 A1 Mar. 1, 2007

(51) Int. Cl.
*A23C 9/12* (2006.01)

(52) U.S. Cl. .............................. 426/43; 426/34; 426/35; 426/36; 426/42; 426/534; 426/535; 426/580; 426/582; 426/650

(58) Field of Classification Search .................. 426/35, 426/535, 41, 34, 36, 37, 38, 39, 40, 42, 43, 426/534, 580, 582, 650

See application file for complete search history.

(56) References Cited

U.S. PATENT DOCUMENTS

| | | | | |
|---|---|---|---|---|
| 3,780,182 | A * | 12/1973 | Johnson et al. | ............... 426/33 |
| 4,244,971 | A | 1/1981 | Wargel et al. | |
| 4,500,549 | A | 2/1985 | Crossman | |
| 4,595,594 | A * | 6/1986 | Lee et al. | ...................... 426/35 |
| 4,670,267 | A | 6/1987 | Chang et al. | |
| 4,708,876 | A | 11/1987 | Yokoyama et al. | |
| 5,462,755 | A | 10/1995 | Mehnert | |
| 6,022,567 | A | 2/2000 | LeCouteux et al. | ........... 426/35 |
| 6,214,585 | B1 | 4/2001 | Kwon et al. | |
| 6,406,724 | B1 | 6/2002 | Reddy et al. | |
| 6,562,383 | B1 | 5/2003 | Moran et al. | |
| 6,827,961 | B1 * | 12/2004 | Bell et al. | .................... 426/582 |
| 7,556,833 | B2 * | 7/2009 | Dias et al. | ...................... 426/34 |
| 2001/0024667 | A1 | 9/2001 | Smith et al. | |
| 2003/0165595 | A1 | 9/2003 | Smith | |

FOREIGN PATENT DOCUMENTS

| | | |
|---|---|---|
| CH | 277288 A | 8/1951 |
| DE | 442 162 C | 3/1927 |
| DE | 44 42 162 C1 | 4/1996 |
| EP | 0 137 536 | 4/1985 |
| EP | 0 981 965 | 3/2000 |
| EP | 1 106 071 A2 | 6/2001 |
| EP | 1 186 244 A2 | 3/2002 |
| EP | 1186244 A2 * | 3/2002 |
| EP | 1 535 519 A1 | 6/2005 |
| GB | 2 170 984 A | 8/1986 |
| JP | 2004-283056 A | 10/2004 |
| RU | 2 064 270 C1 | 7/1996 |

OTHER PUBLICATIONS

G. Urbach, Contribution of Lactic Acid Bacteria to Flavour Compound Formation in Dairy Products, Int. Dairy Journal, 1995, 877-903, 5, Elsevier Science Limited, Ireland.

Druaux et al., Effect of Food Composition and Microstructure on Volatile Flavour Release, Trends in Food Science & Technology, Nov. 1997, 364-368, 8, Elsevier Science Limited.

Patrick F. Fox et al., Cheese: Chemistry, Physics and Microbiology, Kluwer Academic/Plenum, 1993, "Chapter 10, Biochemistry of Cheese Ripening," pp. 389-483.

A. Oumer et al., "Defined starter system including a bacteriocin producer for the enhancement of cheese flavour," Biotechnology Techniques, vol. 13, 1999, pp. 267-270.

Druaux et al., Effect of Food Composition and Microstructure on Volatile Flavour Release, Trends in Food Science & Technology, Nov. 1997, vol. 8 pp. 364-368.

EP 0137536 A1; Cheese-Flavored Substance; Apr. 17, 1985.

* cited by examiner

*Primary Examiner*—Leslie Wong
(74) *Attorney, Agent, or Firm*—Fitch, Even, Tabin & Flannery (57) ABSTRACT

Heat-stable flavor components, which can be used in cheese flavoring systems to prepare food products, including cheeses, having desired flavor profiles. The flavoring components are obtained by addition of flavor-generating whey source as part of a fermentation process in which the whey source provides a source of flavor, and a lipid source is added which traps and stabilizes, and thus preserves, flavor compounds in the fermented mixture during a subsequent heat treatment used for culture inactivation. Methods of making and using these flavoring components and flavoring systems in food products, such as cheese products, also are provided.

29 Claims, 3 Drawing Sheets

HEAT-STABLE FLAVORING COMPONENTS AND CHEESE FLAVORING SYSTEMS INCORPORATING THEM

FIELD OF THE INVENTION

The present invention generally relates to heat-stable flavor components, which may be used in cheese flavoring systems to prepare cheeses having desired flavor profiles. The flavoring components are obtained as part of a fermentation process wherein a whey source provides a source of flavor, and a lipid source added before, during, or at the completion of fermentation acts to trap and stabilize, and thus preserve, the flavor compounds in a subsequent heat treatment used for culture inactivation. Methods of making and using these flavoring components and flavoring systems in food products, such as cheese products, also are provided.

BACKGROUND OF THE INVENTION

Natural cheese traditionally is made by developing acidity in milk and setting the milk with a clotting agent, such as rennet, or by developing acidity to the isoelectric point of the protein. The set milk is cut and whey is separated from the block. The curd may be pressed to provide a cheese block. Curing typically takes place over a lengthy period of time under controlled conditions. Cheddar cheese, for example, is often cured for a number of months, and may be cured for a period in excess of one year, to obtain the full flavor desired.

Numerous reports have been published implicating several compounds to be important in the development of cheese flavor in cheese products. The main classes of compounds thought to contribute to flavor generation in cheese include amino acids, peptides, carbonyl compounds, fatty acids, and sulfur compounds. Urbach, "Contribution of Lactic Acid Bacteria to Flavor Compound Formation in Dairy Products," *Int'l Dairy J.*, 1995, 5:877-903. Several volatile compounds including fatty acids, esters, aldehydes, alcohols, ketones, and sulfur compounds were indicated as contributing to the aroma of various cheeses. Production of several of these aroma and flavor compounds has been attributed to multiple enzymatic reactions and chemical reactions that take place in a sequential manner in ripening cheese.

Various microorganisms have been identified and selected for their ability to produce particular flavors in a cheese-ripening environment. These flavors arise through a series of enzymatic steps. For example, in cheese, degradation of proteins by proteases and peptidases can lead to the production of peptides and free amino acids. These precursors are shuttled through subsequent enzymatic reactions resulting in the formation of flavor compounds. An understanding of these reactions helps in the creation of flavors of a desired cheese type. Fox, P., Cheese: Chemistry, Physics and Microbiology, Kluwer Academic/Plenum (publishers), pp. 389-483, 1993.

Cheese manufacturers are interested in developing cheese products requiring less storage time before they are ripe enough for commercial distribution. Cheese makers have used a wide variety of different techniques in efforts to accelerate the cheese curing or ripening process. U.S. Patent Publication 2001/0024667 provides a summary of a number of these techniques used for accelerating ripening of hard block cheeses.

U.S. Pat. No. 4,244,971 describes a process and product for the rapid manufacture of cheese products, in which a cultured component is prepared and mixed with a milk protein concentrate and a fat concentrate; this mixture is fermented to provide a cheese material capable of being made into process cheese-type products by conventional cheese cooking techniques. The cultured component is prepared by proteolyzing milk protein and lipolyzing milk fat, and forming a mixed fermentate of these hydrolyzed materials. The mixed fermentate is combined with a cheese starter culture and fermented to give the cultured component.

U.S. Pat. No. 5,462,755 describes methods and compositions for flavor enhancement and development in a cultured dairy product using identification and selection of fat fractions from sources such as milk fat (butter) for use as flavor precursors. Another approach used to avoid lengthy cheese ripening periods has been to make a cultured cheese concentrate ("CCC") having more intense cheese flavor, and then use it as a cheese-flavoring agent in another bulk material. CCCs have been manufactured that attain full cheese flavor development within a number of days instead of months. These CCCs are added to other bulk foods, such as process cheeses or snack foods, to impart or intensify a cheese flavor in them.

U.S. Pat. No. 4,708,876, for example, describes methods for the manufacture of such cheese-flavorings and enzyme-modified cheeses (EMCs). Typically the process involves a dairy substrate that is cultured with a lactic culture followed by addition of various proteases, peptidases, and lipases. Cheese flavored concentrates can be obtained from milk as a starting material, instead of cheese curds, or without formation of whey by-product. U.S. Pat. No. 4,500,549 describes use of whey-derived substrates to generate cheese flavorings characteristic of aged cheese. However, the prior above-mentioned processes produce an enhancement of cheese flavor but do not produce targeted cheese flavored components. U.S. Pat. No. 6,406,724 describes methods for producing a natural biogenerated cheese flavoring system that can be used to prepare different cheese products/derivatives. The cheese flavoring system is made up of different components which are combined in different ratios to provide specific favor profiles.

U.S. Pat. No. 4,670,267 describes the production of a fermented whey butter flavoring prepared by fermentation of a sweet whey based medium comprising water, sweet-whey solids, a fortifier selected from citric acid, pyruvic acid, and salts thereof, and a fatty compound enriching agent described preferably as milkfat or lipolyzed butterfat. The sweet whey based medium is pasteurized, inoculated with a starter culture, and incubated to yield an aqueous composition described as a butter flavoring. This patent describes adding milkfat, such as heavy cream, to the sweet whey medium to a concentration (preferably at a level of about 2 percent or less); according to the patent, no further flavor improvement is attainable at higher milkfat concentrations. Alternatively, this patent describes adding lipolyzed butterfat to the sweet whey medium preferably at about 0.2 percent.

European Patent Publication EP 0 981 965 A1 describes a highly flavored component for use in cheese manufacture and a method for producing it in a relatively short period of time. An aqueous, acidified protein and fat cheese flavor precursor is provided by mixing a dried or concentrated protein source, a fat source, an acid source, and water. An enzyme system including a lipase, a protease, and a peptidase is then added to the substrate. The fat source is described as preferably being a milkfat such as anhydrous milkfat, butter, or cream. The protein source is described as preferably being a dairy ingredient such as milk protein concentrate, whey protein concentrate, dried whey, and non-fat dry milk. Before treatment with the enzyme system, the cheese flavor precursor has 5 to 30 percent protein, 10 to 40 percent fat, and 0 to 10 percent lactose. The precursor is treated for a time sufficient to provide a highly developed cheese flavor in the precursor. The precursor is then heated for a time sufficient to inactivate the enzyme system and provide a highly flavored component.

However, these prior processes do not produce enhancements that target specific cheese flavor components.

More recently, a natural biogenerated cheese flavoring system has been developed that can be used to prepare different cheese products/derivatives. This modular approach to flavor creation is described in U.S. Pat. No. 6,406,724. The cheese flavoring system includes different flavor components which are combined in different ratios to provide specific flavor profiles in the cultured cheese concentrate products. U.S. Pat. No. 6,562,383 describes a process for producing a flavored cheese that does not require curing or aging using the flavor components of U.S. Pat. No. 6,406,724.

The effects of bacteriocin producers as adjunct cultures to thermophilic starters of high aminopeptidase activity, more sensitive to lysis by bacteriocins than mesophilic starters, on ripening speed in semihard and hard cheeses has been described in the literature. The use of a bacteriocin-producing *E. faecalis* culture in a cheese starter system for making a semi-hard cheese at low pH values (below 5.5) for enhancement of cheese flavor after a relatively long ripening period (viz., 21 to 35 days), has been described by Oumer et al., "Defined starter system including a bacteriocin producer for the enhancement of cheese flavor," *Biotechn. Techniques,* 13: 267-270, 1999. The use of live cultures having high levels of proteolytic enzymes and peptidolytic enzymes to debitter enzyme modified cheeses (EMCs) also has been described (see, e.g., U.S. Pat. No. 6,214,585).

Despite these developments, a need still exists for cheese flavoring components that can be derived from readily available, cost-attractive natural substrate materials, such as whey sources, and from which flavor may be developed that is highly heat-stable. The present invention provides heat-stable flavor components useful for cultured cheese concentrates and methods for their manufacture that meets these and other desirable needs as well as provides other benefits.

SUMMARY OF THE INVENTION

The present invention generally relates to heat-stable flavor components, which may be used in cheese flavoring systems to prepare very different cheeses having desired flavor profiles. The flavoring components are obtained as part of a fermentation process wherein a whey source provides a substrate for flavor development in a fermented mixture, and lipid such as butterfat (added before, during, or at the completion of fermentation) acts to stabilize and protect flavor developed in fermentation during a subsequently performed heat treatment used for culture inactivation. In one embodiment, the flavoring components are obtained by fermenting a substrate containing a whey source in the presence of a culture for a period of time sufficient to develop flavor in the resulting fermented mixture. The fermented mixture is heated to a temperature and held for a time sufficient to inactivate the culture. The lipid source is added in an amount sufficient to associate with, and preserve, the developed flavor during the subsequent heat treatment.

In one embodiment, a "creamy-buttery" flavor component is provided by fermentation of the whey-based substrate with lactic acid culture. In another embodiment, a "sulfury-cheddar" flavor component is obtained in a multiple-stage fermentation using lactic acid culture in one fermentation stage followed by another fermentation stage using a culturing agent that induces formation of sulfur-containing compounds; preferably the culturing agent is a *Brevibacterium* culture. Each of the sulfury-cheddar and creamy-buttery flavored components can be used as flavor building blocks with their own specific flavor profiles and/or characteristics. Preferably, the lipid phase from the fermentation process, which will contain a significant proportion of flavor compounds (especially the fat soluble flavor volatiles), is collected and used as a flavoring ingredient; in this manner, concentrated flavor components can be obtained and used either individually or in combination with others flavor concentrates to give the desired flavor profile for various food products.

The use of whey or whey derivatives as the primary flavor-generating source according to embodiments of this invention produces cheese flavor components having good taste while offering cost advantages over alternate substrates (e.g., milk/casein-based flavor concentrates). In addition, the use of whey-based substrates for the production of a creamy-buttery flavor component in particular permits lower pH processing to be used in preparing highly flavored components. These lower pH processes provide improved microbial stability and lower viscosity in the flavor component product, thereby increasing product shelf-life without requiring the addition of antimicrobial agents; of course, such additional antimicrobial agents could be added if desired. Moreover, the whey/lipid/water-containing mixtures processed in the methods of embodiments of this invention are less prone to foaming, and are therefore, easier to process.

In general, the whey source is added to the substrate in at least a flavor-generating sufficient amount, and the lipid source is added to the substrate or fermentation matrix in at least a flavor-stabilizing amount relative to the heat treatment for culture inactivation or comparable post-fermentation heat treatments. To achieve these and other advantages, the substrate or fermented mixture, after addition of both the whey source and lipid source, generally comprises about 2 to about 30 percent whey source and about 5 to about 50 percent lipid source, and preferably about 5 to about 15 percent whey source and about 15 to about 30 percent lipid source.

Using the different types of flavored components made by methods of this invention, individually or in combinations thereof as a cultured cheese concentrate, cheeses having a wide variety of flavors can be produced. The cultured cheese concentrates can be incorporated into food products to impart or intensify cheese flavors in the products. For instance, the cheese flavoring system of the present invention can be added as a cultured cheese concentrate to various foods such as cheeses, dairy matrices, snacks, pastas, vegetables, doughs, breads, masa, and the like, to impart a cheese flavor. The cheese or dairy matrix can be selected, for example, from the group consisting of process cheese, natural cheese, cream cheese, cottage cheese, and the like. The flavoring system of the present invention also can be used as a cultured cheese concentrate incorporated into a milk substrate or whey substrate from which cheese is produced. For instance, the cultured cheese concentrates can be added to a milk substrate which is then treated to produce the desired cheese. Alternatively, the flavor concentrates can be added to a cheese or dairy matrix (i.e., a cheese curd and/or dairy solids lacking the desired flavor profile) to produce the desired cheese.

BRIEF DESCRIPTION OF THE DRAWINGS

Other features and advantages of the present invention will become apparent from the following detail description of preferred embodiments of the invention with reference to the drawings, in which.

DETAILED DESCRIPTION

In the present invention, improved flavor components are produced in which a whey source is used for the development of particular flavors via fermentation and enzymatic conversions, and a lipid source is added to stabilize and protect those developed flavors against heat to which they are exposed in post-fermentation processing. The lipid is incorporated before, during, or at the completion of fermentation, and before subsequent heat treatment. The lipid acts as a flavor carrier that helps in trapping and stabilizing the developed flavor compounds during the post-fermentation heat-processing step used to inactivate cultures and enzymes and stop further acidification. Although not wishing to be limited by theory, the lipids may also aid in the development of flavor compounds (e.g., lactones) during the post-fermentation heat-processing step.

Moreover, although not wishing to be limited by them, the association of the flavor compounds in the fatty matrix based on lipid appears to be mainly physical rather than chemical in nature. Consequently, the fatty matrix allows easy release of flavor upon consumption of a food product incorporating the flavor component, resulting in improved flavor perception to a consumer.

The embodiments of the present invention permits the use of cost-attractive substrates based on whey and whey derivatives in place of casein-based substrates to produce various cheese flavor components. The use of whey based substrates for the production of a creamy buttery flavor component allows for lower processing pH to be used than can be achieved with milk/casein based flavor concentrates. This results in improved microbial stability, lower viscosity, longer shelf life. If desired, the use of the antimicrobial agents can be reduced or eliminated.

The flavor components or concentrates of embodiments of this invention can be used individually or in combination with other types of flavor components to give a desired flavor profile. Such flavor profiles can mimic, enhance, and/or modify a particular flavor. For instance, these generated flavors can be used in cheese flavoring systems (i.e., cultured cheese concentrates as those described in U.S. Pat. No. 6,406,724) to create flavor profiles of various fermented dairy products.

Substrate. The substrate fermented to produce flavor components comprises an aqueous whey source. It preferably, but not necessarily, contains a lipid source. As noted, a portion or all of the lipid source alternatively may be incorporated during or at the completion of fermentation.

Water is included in the substrate containing the whey source sufficient to provide a moisture level of about 30 to about 90 percent, preferably from about 40 to about 60 percent. The solids content of the substrate is generally about 10 to about 70 percent, preferably from about 40 to about 60 percent. The substrate in this invention is generally processed as an aqueous mixture of the solids, which may be dispersed or dissolved in solution. It will be appreciated that one or more solids may be introduced to the substrate in aqueous form; the aqueous content of which contributes to the above-noted overall moisture content of the substrate.

As noted, the whey source is added in at least a flavor-generating sufficient amount, and the lipid source is added in at least a flavor-stabilizing amount relative to the heat treatment for culture inactivation or comparable post-fermentation heat treatments. The substrate, after addition of both the whey source and lipid source, generally comprises from about 2 to about 30 percent whey source and about 5 to about 50 percent lipid source, and preferably about 5 to about 15 percent whey source and about 20 to about 30 percent lipid source. If the lipid, or a portion thereof, is added during or after fermentation, the total lipid level should be relative to the similar amount of whey source to the levels just given.

The whey source may be selected generally from any available whey products. Whey is a by-product of cheese manufacture. After milk is separated by coagulation into curds and whey, the whey is drained from the curds (casein). Suitable whey sources include, for example, dry or liquid whey protein concentrate (WPC), whey protein isolate, sweet whey, liquid or dried acid whey, reconstituted whey, whey powder, whey powder blends, lactalbumin, whey cheese, and the like, as well as, mixtures thereof. The whey sources can contain varying amounts of protein. For example, WPCs may be manufactured by ultrafiltration, evaporation, and drying to provide products containing about 34 to about 80 percent protein and average about 4 percent moisture; such WPCs are generally water soluble. Whey protein isolates generally contain more than about 90 percent protein. The whey source may also contain casein.

The lipid source may be an edible lipid including, but not limited to, milk fats (i.e., fat components in milk that are separable by churning), lauric acid-containing oils (e.g., palm and related oils), oleic-linoleic acid-containing oils (cotton seed, corn, peanut, sunflower, and related oils), linolenic acid-containing oils (e.g., soybean and related oils), as well as mixtures thereof. The preferred lipid source is a milk fat, including, for example, anhydrous milkfat, concentrated milkfat, anhydrous butterfat, buttermilk, anhydrous buttermilk, and the like as well as mixtures thereof. The lipid source may also contain synthesized counterparts and other natural sources of milkfat lipids.

Substrate Processing. If necessary, the pH of the substrate can be lowered prior to fermentation to a suitable range for flavor development (i.e., a pH of about 4.4 to about 6 and preferably about 4.8 to about 5.6) by the addition of an edible acid and/or by virtue of the lactic acid producing microorganism used in fermentation. If used, suitable edible acids are non-toxic, inorganic or organic acids, which include hydrochloric acid, acetic acid, maleic acid, tartaric acid, citric acid, phosphoric acid, lactic acid, and mixtures thereof. In preparing the substrate, a combined homogenization and pasteurization treatment preferably is used to reduce the fat droplet particle size and insure homogeneity of the substrate prior to fermentation.

In one exemplary non-limiting embodiment, the substrate is homogenized, and pasteurized under high temperature short time (HTST) conditions before fermentation. The resulting mixture is then subjected to fermentation to prepare the specific flavoring components of the present invention. Preferably, about 1 to about 2 percent salt is added to the substrate prior to treatment along with the various enzymes/cultures/additives to produce the specific flavoring components.

In one embodiment, a creamy-buttery flavor component is prepared by fermentation of the substrate in the presence of a lactic acid culture. Preferably the mixture is aerated during fermentation. The fermented mixture containing milkfat (before, during or after fermentation) is then heated at a temperature and for a time sufficient to inactivate the culture and enzymes. The presence of the lipid in the fermented mixture acts to protect and prevent significant degradation or loss of the flavor compounds generated during fermentation is from the thermal effects of the heat treatment. As noted, the lipids may also aid in the development of flavor compounds (e.g., lactones) during the post-fermentation heat-processing step.

In another embodiment, a sulfury-cheddar flavor component is prepared by two stage fermentation of the substrate. The first stage fermentation conducted in the presence of a lactic acid culture, followed by a second stage fermentation using a culture that promotes sulfury-flavor compound development. The latter culture may be, for example, a *Brevibacterium linens* culture or a yeast from the genera *Debaromyces* or *Kluyeromyces*. The *Brevibacterium linens* culture or yeast converts sulfur-containing compounds in the substrate to organoleptically potent sulfur-containing flavor compounds. The resulting fermented mixture is then heat treated at a temperature and for a time sufficient to inactivate the culture and enzymes. Again, the presence of the lipid in the fermented mixture protects and prevents significant degradation or loss of the desired flavor compounds generated during the two-stage fermentation from the thermal effects of the heat treatment. More details on the methods for producing the creamy-buttery and sulfury-cheddar flavor components are provided below.

Flavor Components. After the heat inactivation steps, the flavored components obtained can be used individually or can be combined in groups with each other and/or other types of cheese flavoring components to provide a desired highly flavored cultured cheese concentrate.

In one aspect, a whey source may be supplied as a starting material for only a single type of fermentation procedure to focus on development of a particular cheese flavor component. For example, a creamy-buttery or sulfury-cheddar component alone can be produced and used as the sole flavor component of the finished concentrate. In one preferred embodiment, the creamy-buttery flavor component is used individually to flavor a food product, such as cream cheese, process cheese, margarine, and the like.

The amount of added flavor component to a food product may vary depending on the amount needed to impart a desired taste effect. In general, the flavor component can impart favorable affects on taste in a food product at relatively low addition levels (e.g., about 0.5 to about 10 percent, depending on the food product).

In one aspect, the substrate can be divided into one, two, three, or more portions, each of which is treated (i.e., fermented) with specific enzymes, cultures, adjuncts, and other additives for predetermined time periods sufficient to develop specific flavor characteristics. Specific enzymes, cultures, adjuncts, and other additives may be provided from which the "sulfury-cheddar" component, the "creamy-buttery" component, as well as other types of flavor components (such as a "cheesy" component), can be produced. Each component stream can be subjected to an optional homogenization step before or after fermentation. After fermentation, each portion is then heated to a temperature and held at that temperature for a time sufficient to inactivate the culture and enzyme systems. As noted, the improved creamy-buttery and sulfury-cheddar components may be prepared from whey-based substrates that include a lipid source to protect the flavor compounds during the post-fermentation heat treatment used to inactivate the culture. The processes for preparing these flavor components do not require whey drainage steps.

The cheesy component that may be used in the flavoring system can be made by methods as described in U.S. Pat. No. 6,406,724. Either one or both of the creamy-buttery component, or the sulfury-cheddar component according to methods of this invention can be combined with one or more different flavoring components made as described in U.S. Pat. No. 6,406,724. A cultured cheese concentrate of this invention will contain at least one type of flavor component made by a method of this invention.

In one embodiment, cultured cheese concentrates of this invention contain about 1 to about 80 percent of the sulfury-cheddar component, about 10 to about 90 percent of the creamy-buttery component, and about 10 to about 90 percent of the cheesy component. In a more particular embodiment, the cultured cheese concentrate of this invention contains about 25 to about 75 percent of the sulfury-cheddar component, about 25 to about 75 percent of the creamy-buttery component, and about 25 to about 75 percent of the cheesy component. The cultured cheese concentrate can be a physical blend of the flavor components. Alternatively, the flavor components can be introduced separately into a food product or food product precursor. As indicated, the different flavor components can be prepared concurrently in different process streams, or in separate process runs, prior to combination.

In another embodiment, the different types of flavor components can be added to a milk substrate, which is then used to form a cheese. Alternatively, the flavor components can be added to an already prepared cheese base, such as cream cheese, process cheese, natural cheese, and the like. The relative amounts of any one or more of the flavor components contained in a cultured cheese concentrate of this invention, as well as the total amount of cultured cheese concentrate incorporated, can be varied to achieve particular flavor combinations or flavor notes depending on the desired flavor characteristics. Using one or more of the three flavor components and a cheese base, a wide variety of cheese types can be prepared, including those types described in U.S. Pat. No. 6,406,724.

Generally, the resulting cheeses contain about 1 to about 10 percent of the cultured cheese concentrate and preferably about 2 to about 6 percent thereof. It will be appreciated that both the relative and total amounts of the various components can be modified and/or optimized to achieve a particularly desired flavor profile. Additionally, these flavor components can be used alone or in combination to obtain other flavored cheeses or used in various cheese bases (e.g., process cheeses, process cheese-type food products, natural cheeses, cream cheeses, cottage cheeses, and the like).

The preparation of each of the creamy-buttery and sulfury-cheddar flavor components according to embodiments of this invention will now be described in more detail with reference to the figures.

Figure 1:
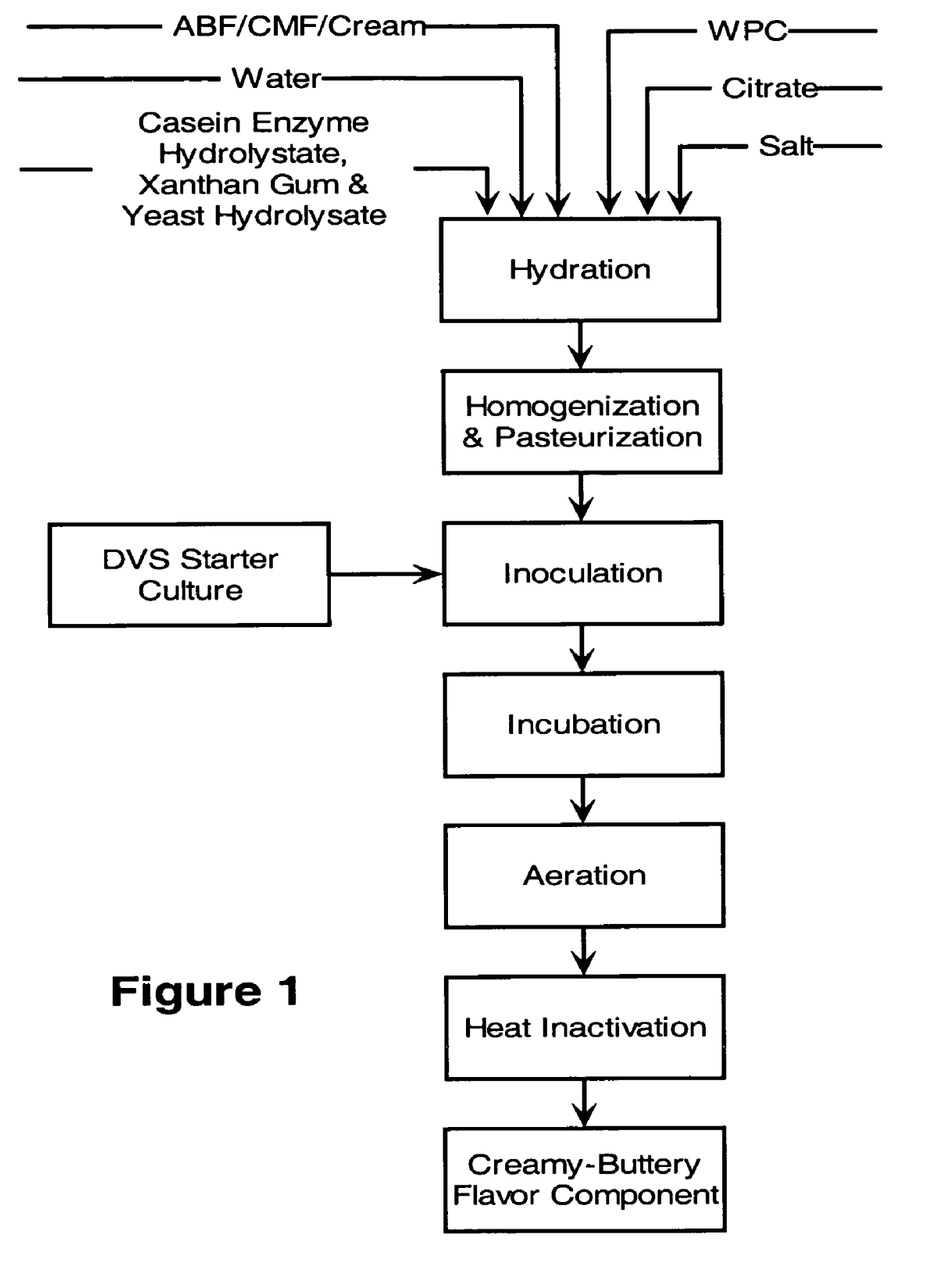
FIG. 1 generally illustrates the preparation of a creamy-butter flavor component of the present invention.

Creamy-Buttery Component. Referring to FIG. 1, in a method of the present invention, a heat-stable creamy-buttery flavor component can be prepared by fermentation of a whey-based substrate in which a butter fat source is introduced before the fermented mixture is heat treated to inactivate the culture.

A substrate containing a whey source (i.e., WPC) is prepared in a hydration process. The whey source can be selected from the above-noted whey source materials. In addition, salt, sodium citrate, xanthan gum, casein enzyme hydrolysate, and yeast hydrolysate are included in the substrate. In this illustration, a lipid source (i.e., cream, ABF, CMF) is incorporated into the substrate mixture before a subsequent fermentation step, although the lipid source alternatively can be introduced in part or entirely during or at the completion of fermentation. The lipid source may be selected from the above-noted milk fat and other lipid materials.

The substrate is homogenized and pasteurized before fermentation. Then, the preparation of the creamy-buttery component is preferably carried out by inoculating the substrate with a lactic acid culture, and fermenting the inoculated substrate in a single-stage fermentation process at temperature and for a time sufficient to provide the flavor development desired, although multiple stage procedures are also possible.

The preparation of the creamy-buttery component is carried out by adding a lactic acid culture to a substrate containing a whey source such as described herein and then fermenting the mixture at about 20 to about 35° C. for about 10 to about 24 hours, preferably at about 28 to 32° C. for about 12 to about 20 hours.

The lactic acid culture used should convert lactose to lactic acid and reduce the pH. The lactic acid culture used in the present invention include those commonly used in lactic acid fermentation. Thus, for example, *Lactoococcus cremoris, Lactococcus lactis*, and mixtures thereof can be used. In one preferred embodiment, a commercially-available DVS starter culture comprising a combination of *Lactococcus cremoris, Lactococcus lactis, Leuconostoc cremoris*, and *Lactococcus lactis* ssp *diacetylactis*, is used as the lactic acid culture. In preparing the creamy-buttery component, a lactic acid culture is generally used in the substrate at a level of about 0.005 to about 0.1 percent, preferably about 0.0075 to about 0.015 percent.

The fermentation vessel is preferentially provided with mixing equipment to insure good contact between the cultures, enzymes and the substrate materials and to maintain the solids in suspension. A scraped surface-mixing tank is preferred. A recirculating and/or homogenizing device may be employed to prevent segregation of a fat phase from aqueous materials and to aid in maintaining the solids in suspension. Water may be added during the fermentation to maintain desired moisture content and acidic or basic materials may be added to adjust the pH.

In one embodiment, the fermented mixture is subject to aeration either during at least part of the fermentation procedure, or, alternatively, immediately thereafter and before a subsequent culture inactivation heat treatment, to prevent anaerobic conditions and to provide good mixing. Aeration is preferably effected using air introduced into the reaction mixture using a diffusion plate or an in-line air sparger. If appropriate (i.e., if phase separation occurs), the reaction mixture can optionally be homogenized prior to further treatment. Preferably, aeration is discontinued throughout the subsequent heat inactivation process. The desired flavor level can be judged organoleptically and can be estimated through analytical measurements, such as pH, titratable acidity, and/or concentration of free fatty acids, organic acids, lactones, diacetyl, acetoin, and amino acids.

After conducting the fermentation, aeration and lipid addition steps (in any convenient order thereof), the cultures in the fermented mixture are inactivated by heating (i.e., pasteurization) the fermented mixture to about 63 to about 88° C. for about 16 seconds to about 30 minutes, preferably to about 68° C. for about 10 minutes, to provide a creamy-buttery flavor product having heat-stable flavors.

Significantly, in this method a lipid source is added to the substrate and/or fermented mixture in an amount sufficient to form a fatty matrix that associates with, and protects, the flavor compounds generated during fermentation from heat destabilization and/or loss of flavor during the subsequent heat treatment performed to inactivate the culture used in fermentation.

In one particular preferred embodiment, the creamy-buttery component is prepared by treating a substrate containing a whey source (about 5 to about 15 percent on a dry basis) and lipid source (about 15 to about 30 percent) at an initial pH of about 6 to about 6.7). Other common cheese concentrate additives and processing aids also may be included in the substrate in minor amounts sufficient for their intended respective functions. Examples of such additives include salt, thickeners (e.g., xanthan gum), starter media for cheese cultures (e.g., yeast hydrolysate), emulsifiers, and the like.

The substrate is homogenized and pasteurized at about 63 to about 88° C for about 16 seconds to about 30 minutes in a heat exchanger, and then is cooled to about 21 to about 27° C. Then, the substrate is inoculated with a DVS culture comprising a lactic acid culture including lactic acid bacteria which have the ability to produce diacetyl from a citrate or citric acid additive or the like included in the substrate. Preferred diacetyl-producing cultures include *Leuconostoc cremoris* and *Lactococcus Lactis* ssp. *Lactis biovar. Diacetylactis*. The citrate additive may be sodium citrate, calcium citrate, and other edible salts of citric acid, and so forth. The citric acid or citrate salt used for this purpose generally is mixed into the substrate in an amount of from about 0.1 to about 1.5 percent.

In this preferred embodiment, fermentation is carried out for about 16 hours at a temperature of about 30° C. The resulting fermented mixture is aerated for about 24 hours at about 22° C. The resulting fermented mixture has a pH of 5.4 or less. The lipid component, assuming it has not already been added can be added at the end of the fermentation process.

When the target flavor is reached, the culture and enzymes are deactivated by heating the fermented mixture to a temperature of about 63 to about 88° C., and holding it at about that temperature for about 16 seconds to about 30 minutes. The heat treatment can be performed in a heat exchanger or other convenient heating system.

The creamy-buttery flavored component produced is typically a paste-like substance with a moisture content of about 30 to about 90 percent, preferably about 40 to about 60 percent. The flavored component may be dried, if desired, to provide a powder with or without the addition of carrier materials, such as maltodextrins. Preferred drying techniques include spray drying and freeze drying.

The creamy-buttery components made according to this embodiment of this invention have superior taste, processability, microbial stability, and shelf-life.

Figure 2:
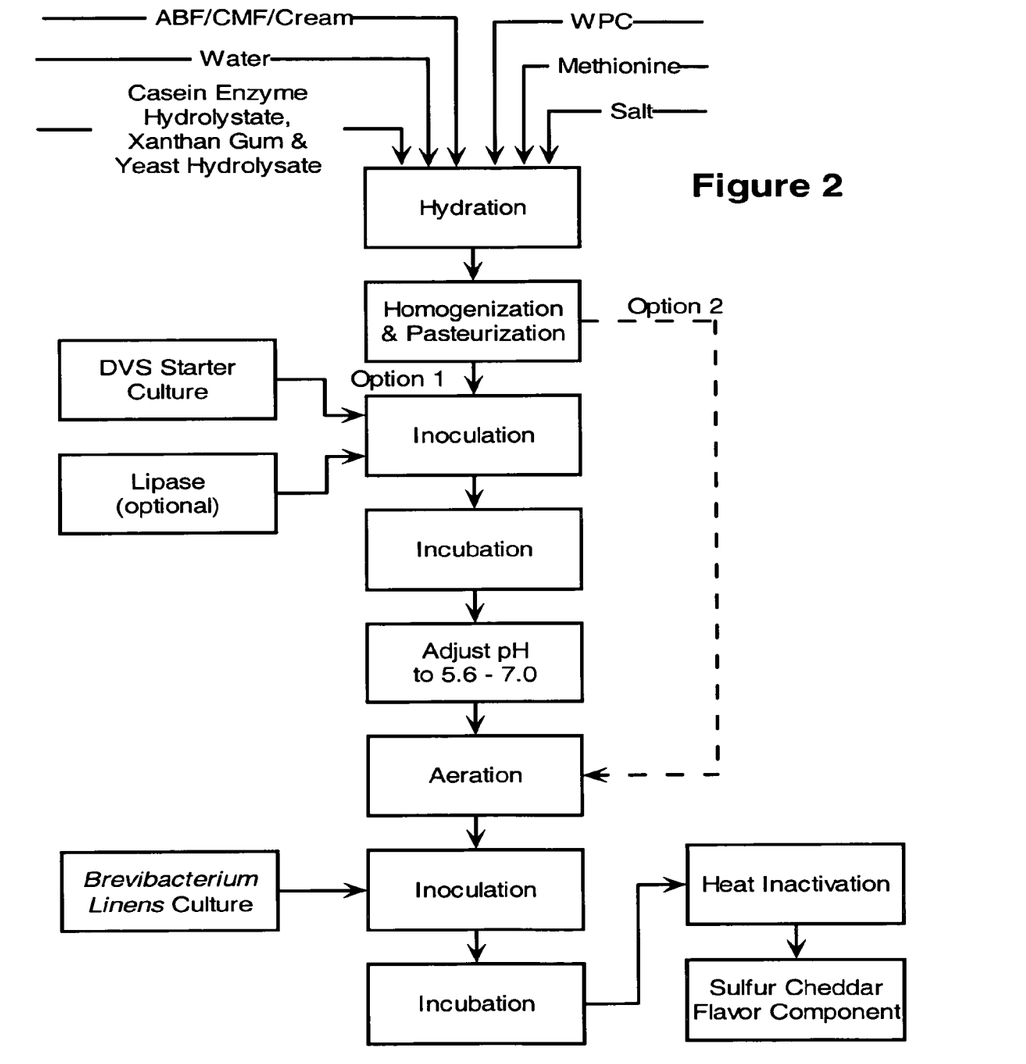
FIG. 2 generally illustrates the preparation of a sulfury-cheddar containing component of the present invention.

Sulfury-Cheddar Component. Referring now to FIG. 2, a heat-stable sulfury-cheddar flavor component is prepared by multiple stage fermentation method (Option 1 in FIG. 2) or by a single stage fermentation method (Option 2 in FIG. 2) of a whey-based substrate and introduction of a lipid source before the fermented mixture is heat-treated to inactivate the culture. In FIG. 2, a lipid source (e.g., cream, anhydrous milkfat, concentrated milkfat) is incorporated into the substrate mixture before subsequent fermentation steps, although, as previously indicated, the lipid source alternatively can be introduced in part or entirely during or at the completion of fermentation. The lipid source used in this embodiment also may be selected from the above-noted milk fat and other lipid materials.

The preparation of the sulfury-cheddar component is preferably carried out in a two-stage fermentation process, such as illustrated as Option 1 in FIG. 2. The hydration process and homogenization/pasteurization process which are initially performed on the substrate are generally similar to the corresponding steps described with respect to the creamy-buttery component. The substrate used to prepare the sulfury-cheddar component, however, includes sulfur-containing compounds which can be used to assist sulfur flavor development during fermentation.

In this illustration, a sulfur-containing substrate compound is added to the substrate before fermentation. The sulfur-containing substrate preferably should be introduced no later than the inoculation of the reaction mixture to initiate generation of sulfur flavor compounds during a fermentation stage, described in more detail below. Therefore, in this embodiment, the sulfur-containing substrate is introduced no later than just before the *Brevibacterium linens* stage of fermentation.

For purposes of this invention, the "sulfur-containing substrates or compounds" are sulfur-containing free amino acids, tri-peptides containing sulfur-containing amino acids, and protein hydrolyslates containing sulfur-containing amino acids. Suitable food protein hydrolysates are available, for example, from Quest International (Hoffman Estates, Ill.) under tradenames N-Z-AMINE™ (casein enzyme hydrolysate), N-Z-CASE™ (moderately digested casein enzymatic hydrolysate), HY-CASE™ (casein acid hydrolysate), and PEPTICASE™ (casein hydrolysate), as well as from other suppliers. Preferably, the sulfur-containing substrates include L-methionine, L-glutathione, and L-cysteine. In especially preferred embodiments, the sulfur-containing substrate is a mixture of L-methionine and L-glutathione, a mixture of L-methionine and L-cysteine, or a mixture of L-methionine, L-glutathione, and L-cysteine. The sulfur-containing compounds are generally added at a level of about 0.01 to about 1 percent.

After hydration and homogenization in Option 1, a lactic acid culture is added to a substrate containing a whey source, which has been previously homogenized/pasteurized as described above. The resulting mixture is incubated at about 20 to about 35° C. for about 10 to about 24 hours, particularly at about 28 to 32° C. for about 12 to about 20 hours, to obtain a mixture having a pH of about 5.4 or less.

The lactic acid culture used should convert lactose to lactic acid and reduce the pH. Suitable lactic acid cultures include those noted above in the descriptions of the creamy-buttery flavor component. One preferred useful lactic acid culture is a DVS starter culture (e.g., R603 from Chr. Hansens, Inc., which contains *Lactococcus lactis* and *Lactococcus lactis* ssp *cremoris*). In preparing the sulfury-cheddar component, the lactic acid culture is generally used at a level of about 0.005 to about 0.05 percent, preferably about 0.0075 to 0.015 percent. A lipase culture may optionally be included with the lactic acid culture. Lipase (sometimes referred to as an esterase) is an enzyme which is well known in the art. Lipase are typically derived from the gullet tissues of young animals (calves, kids, or lambs), from the pancreas of adult animals, or from microbial sources. Various commercial preparations derived from gullet tissue are available from Degussa, Rhodia, or other such companies under various trade names. Microbial sources of lipase are, for example, the molds *Candida cylindracea* Type VIII, *Aspergilus oryzae, A. niger, Pencillium roqueforti, P. glaucum*, and *Rhizopus oryzae*. The lipase, if used, is preferably a fungal lipase and is generally used at a level of about 0.05 to about 0.4 percent. Inclusion or omission of such lipase enzymes in Option 1 allows for subtle modifications of the final flavor profiles.

Then, for second stage fermentation in Option 1, a *Brevibacterium linens* culture or a yeast from the genera *Debaromyces* or *Kluyeromyces* is introduced into the first fermented mixture generally at about 1 to about 3 percent (preferably about 2 percent). The *Brevibacterium linens* culture or yeast can convert the sulfur-containing substrate to organoleptically potent sulfur-containing flavor compounds. The fermentation is continued for about 72 to about 240 hours at a temperature of about 18 to about 35° C., particularly about 18 to about 48 hours at a temperature of about 20 to about 26° C.

Preferably the *Brevibacterium linens* culture is used as a flavor adjunct culture to produce sulfur flavor compounds. The enzymes used can be produced from various microorganisms or extracted from plant or animal tissues. The various enzymes of the enzyme system are available commercially as dry powders or in liquid form. If desired, a microorganism genetically modified so as to provide similar *Brevibacterium linens* activity can be used in place of the *Brevibacterium linens* culture. For purposes of this invention, such a genetically modified microorganism is considered to be included within the term "*Brevibacterium linens* culture." Preferably the pH is adjusted to about 6 prior to addition of the *Brevibacterium linens* culture.

Preferably, there should be no heat inactivation of enzymes/cultures between the two fermentation stages. Preferably, both stages are carried out in a single vessel. Preferably, the reaction mixture is subject to aeration during fermentation to prevent anaerobic conditions and to provide good mixing. Generally, conditions should be maintained to minimize phase separation during fermentation. If phase separation does occur, an optional homogenization step can be used after fermentation. There generally is no whey draining step in the process.

Although it is preferred that the two fermentation stages be carried out sequentially, as shown in FIG. 2 (Option 1), they may be combined into a single stage fermentation process. Such a single stage fermentation procedure may be carried out at about 18 to about 30° C. for about 24 to about 240 hours.

Again for either Option 1 or Option 2, the lipid source is added to the substrate or fermented mixture in an amount sufficient to form the fatty matrix that associates with, and protects, the flavor compounds generated during fermentation from heat destabilization and/or loss of flavor during subsequent heat treatment performed to inactivate the culture.

Option 2 in FIG. 2 involves a single stage fermentation process wherein the homogenized and pasteurized product is passed directly to the *Brevibacterium linens* fermentation process (preferably including aeration). In this option it is generally not necessary to adjust the pH prior to the *Brevibacterium linens* fermentation step. The *Brevibacterium linens* fermentation step, as well as the remainder of the process, is carried out as essentially described above for Option 1. Selection of Option 1 (with or with addition of lipase) or Option 2 allows for subtle modifications of the final flavor profiles.

After conducting the two fermentation steps or stages (Option 1) or the single fermentate step or stage (Option 2) and addition of the lipid source (in any convenient order thereof), the cultures and enzymes are inactivated by heating the fermented mixture to about 63 to about 88° C. for about 16 seconds to about 30 minutes, preferably to about 68° C. for about 10 minutes. The heat treatment can be performed in a heat exchanger or other convenient heating system. The reaction mixture optionally may be recirculated during inactivation to improve heat transfer.

By this method, a sulfury-cheddar flavor component product having strong sulfur notes is obtained. The sulfury-cheddar flavored component produced is typically a paste-like substance with a moisture content in the range of from about 30 to about 90 percent, preferably from about 40 to about 60 percent. The flavored component may be dried to provide a powder with or without the addition of carrier materials, such as maltodextrins. Suitable drying techniques include spray and freeze drying.

In one particular preferred embodiment, the sulfury-cheddar component is prepared by treating a substrate comprising a mixture of whey protein concentrate (about 3 to about 30 percent), butterfat as anhydrous butterfat (about 2 to about 50 percent), and a sulfur-containing substrate such as L-methionine (about 0.01 to about 2 percent). The substrate is homogenized and pasteurized at about 63 to about 88° C. for about 16 seconds to about 30 minutes in a heat exchanger, and then is cooled to about 21 to about 27° C. Then, the substrate is inoculated with a DVS culture as described above and subjected to first stage fermentation conducted at about 30° C for about 16 hours. The resulting fermented mixture is preferably adjusted to about 6.

Without any intermediate inactivation, treatment continues with addition of a *Brevibacterium linens* culture (about 0.01 to about 2 percent). The second stage fermentation preferably is carried out for about 16 to about 48 hours at a temperature of about 20 to about 26° C. When the target flavor is reached, the culture and enzymes are deactivated by heating the fermented mixture to a temperature of about 63 to about 88° C., and holding it at that temperature for about 16 seconds to about 30 minutes. The heat treatment can be performed in a heat exchanger or other convenient heating system.

The resulting sulfury-cheddar component generally has the flavor characteristics/profile shown in U.S. Pat. No. 6,406,724. The sulfury-cheddar component likely contains other potent aroma or flavor compounds, including sulfur-containing compounds, which have not been detected.

Figure 3:
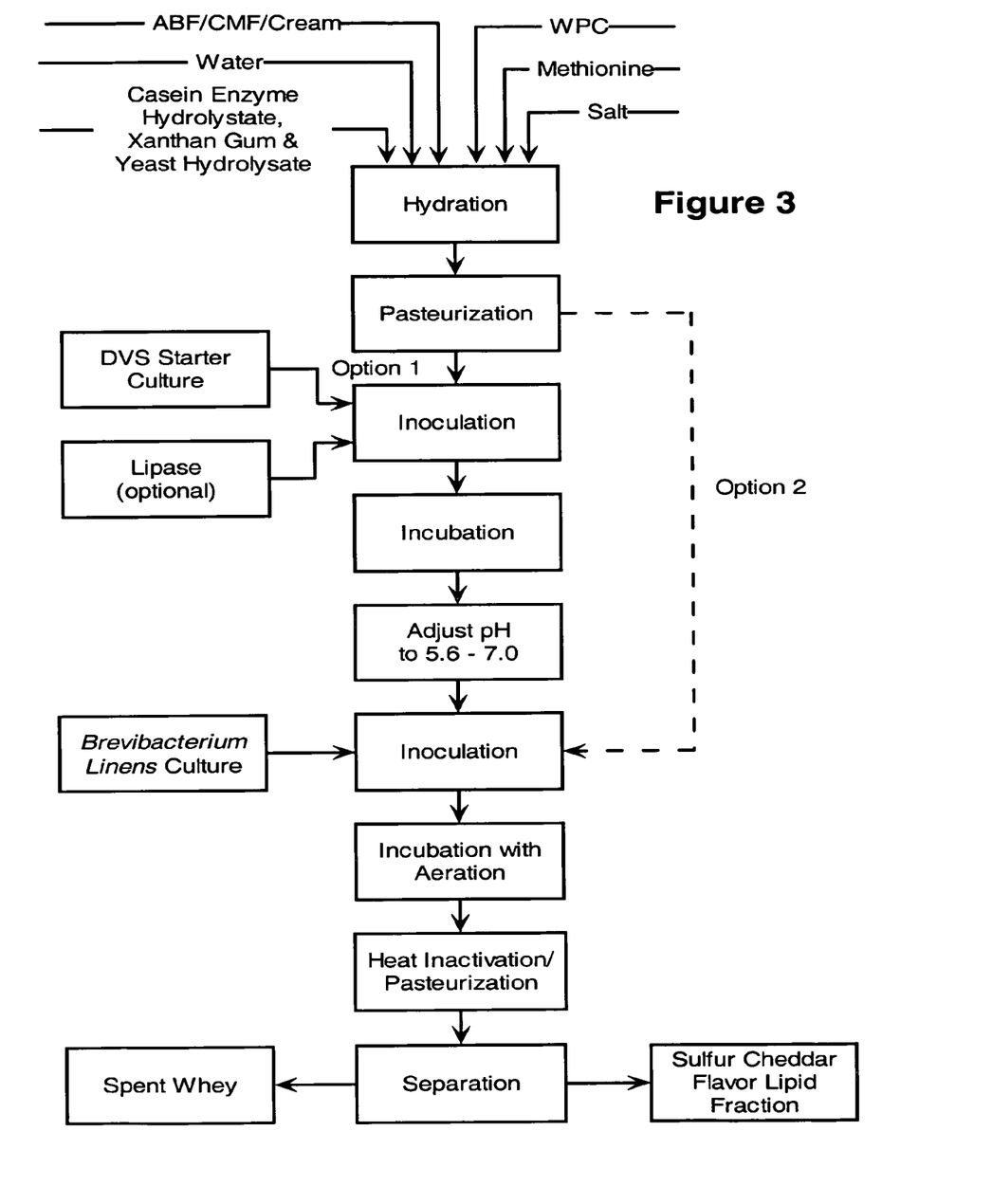
FIG. 3 illustrates an alternative process for the preparation of a sulfury-cheddar containing component of the present invention wherein the lipid phase is separated as the flavor concentrate.

FIG. 3 illustrates a further embodiment of the present invention wherein the lipid phase is separated as the flavor concentrate. Although FIG. 3 is specifically directed to the production of a sulfury flavor concentrate using Options 1 and 2 which are similar to those of FIG. 2, the lipid phase separation step could also be applied to the production of the creamy-buttery flavor concentrate. As shown in FIG. 3, the product from the fermentation process is further treated in a conventional separation step to obtain a lipid phase (which is highly concentrated relative to volatile flavor components) and an aqueous phase (i.e., spent whey phase). Thus, the lipid is used both to stabilize the flavor components during the heat treatment used to inactivate the enzymes as well as to act as a carrier to further concentrate the flavor components after the heat treatment step. As noted, any conventional separation technique can be used to collect the lipid phase. Examples of such techniques include phase separation, centrifugation, and the like. If desired, the spent aqueous whey stream may be further treated (e.g., extraction using the same or a different lipid as used in the fermentation process) to concentrate and collect any flavor components that may remain therein.

The following examples further illustrate the present invention. Parts and percentages throughout the specification are given by weight unless otherwise indicated. All references cited in the present specification are hereby incorporated by reference in their entireties.

EXAMPLE 1

This example illustrates the preparation of a creamy-buttery component as a flavor concentrate. Production of a creamy buttery component was conducted generally in accordance with the process scheme shown in FIG. 1.

A substrate was prepared by combining 25 percent anhydrous butterfat (ABF) as the lipid source material, 6 percent whey protein concentrate (WPC 34) as the whey source, and 68 percent total water. In addition, about 0.5 percent salt, about 0.3 percent trisodium citrate, about 0.4 percent xanthan gum, about 0.1 percent casein enzyme hydrolysate (as NZ-Amine™ from Quest International), and about 0.1 percent yeast hydrolysate were added with mixing.

The resulting mixture was homogenized and then pasteurized under high temperature short time (HTST) conditions at about 73° C. for about 16 seconds in a heat exchanger, and then was cooled to about 25° C. The resulting intermediate product contained about 32 percent solids, about 6 percent whey source material (dry weight basis), and about 25 percent butterfat and had a pH of about 6.5. The resulting intermediate product was used to prepare the specific flavoring components of these examples according to a single stage fermentation procedure.

In the inoculation step, a DVS starter culture (about 0.01 percent; *Lactococcus lactis, Lactococcus lactis* ssp *diacetylactis*, and *Leuconostoc cremoris*) was added to the substrate. For fermentation, the inoculated substrate was incubated at 26° for 16 hours. Then the fermented mixture was aerated at a temperature of 22° for 24 hours.

The culture was inactivated by heat treating the fermented mixture at 68° C. for 30 minutes. A pasty-like flavor component product was obtained comprising about 32 percent solids and about 68 percent moisture. A portion of the creamy-buttery component product obtained was combined in an amount of 1.5 percent with a commercial whipped light soft cream cheese, and the flavor component was found to improve the flavor of the cream cheese as compared to the original food product.

EXAMPLE 2

This example illustrates the preparation of a sulfury-cheddar component as a flavor concentrate. Production of a sulfury-cheddar component was conducted generally in accordance with the process scheme shown in FIG. 2 using Option 1 without optional lipase addtion.

A substrate was prepared by combining 25 percent anhydrous butterfat (ABF) as the lipid source material, 6 percent whey protein concentrate (WPC 34) as the whey source, and 68 percent total water. In addition, about 1 to about 2 percent salt, 0.1 percent L-methionine as a sulfur-containing substrate, 0.4 percent xanthan gum, 0.1 percent casein enzyme hydrolysate (N-Z-AMINE™ from Quest International), and 0.1 percent yeast hydrolysate were added with mixing.

The resulting mixture was homogenized, then pasteurized under high temperature short time (HTST) conditions at about 73° C. for about 16 seconds in a heat exchanger, and then it was cooled to about 25° C. The resulting intermediate product contained about 32 percent solids, about 6 percent whey source material, and about 25 percent butterfat, and had a pH of 6.5. The resulting intermediate product was used to prepare the specific flavoring components of these examples using a two-stage fermentation procedure.

In the initial inoculation step, a DVS starter culture (0.01 percent; R603 from Chr. Hansens, Inc., which contains *Lactococcus lactis* and *Lactococcus lactis* ssp *cremoris*) was added to the substrate. For first stage fermentation, the inoculated substrate was incubated at 30° C. for 16 hours to a pH of 4.5; the pH was then adjusted to 6.0 using 0.2 N sodium hydroxide.

As the second stage fermentation, an activated culture of *Brevibacterium linens* (2 percent) was added to the first stage fermentation product to initiate the second stage of the fermentation process. Prior to its use, the *Brevibacterium linens* culture was activated under aerobic conditions for 48 hours at 24° C. in tryptic soy broth (TSB). The fermented mixture was aerated at a temperature of 22° C. for 24 hours. The second stage fermentation was continued for an additional 24 hours with aeration at a temperature of 25° C.; the pH of the reaction mixture at the end of the second fermentation stage was 6.0.

The resulting sulfury-cheddar component was heated to 63° C. for 30 minutes in order to inactivate the cultures and enzymes and to extend the shelf life of the product.

A pasty-like flavor component product was obtained comprising about 32 percent solids and about 68 percent moisture. The sulfury-cheddar component obtained could, if desired, be spray dried to form a sulfury-cheddar flavor powder.

The sulfury-cheddar component produced using the whey-based substrate and the addition of a lipid source was found to have at least comparable flavor characteristics to a sulfury-cheddar component made according to Example 1 of U.S. Pat. No. 6,406,724.

EXAMPLE 3

This example also illustrates the preparation of a creamy-buttery component as a flavor concentrate. Production of a creamy buttery component was conducted generally in accordance with the process scheme shown in FIG. 1.

An aqueous mixture containing whey protein concentrate (WPC 34; 6 percent), anhydrous milk fat (AMF; 25 percent), sodium chloride (0.5 percent), sodium citrate (0.3 percent), yeast extract (0.1 percent), and hydrolyzed casein (N-Z-AMINE™ from Quest International; 0.1 percent) was prepared. Xanthan gum (0.4 percent) was added to stabilize the mixture. The resulting mixture was homogenized and pasteurized under high temperature short time (HTST) conditions at about 73° C. for about 16 seconds in a heat exchanger and then cooled to about 30° C. The resulting dairy product was used to prepare the specific flavoring components of this example.

A lactic acid starter culture (0.01 percent; *Lactococcus lactis* and *Lactococcus lactis* ssp. *cremoris* (R603 from Chr. Hansens, Inc.) along with *Lactococcus lactis* ssp *diacetylactis* and *leuconostoc cremoris* (about 0.001 percent of each) were added to the dairy product and fermented for 16 hours at 30° C. to a pH of 4.5. Sodium citrate (0.3 percent) was added and the resulting mixture was aerated at 22° C. for 24 hours. Disodium phosphate (DSP; 1 percent) was added and the resulting buttery acidic component was heated to 74° C. for 16 seconds in order to inactivate the cultures and extend the shelf life of the product.

While the invention has been particularly described with specific reference to particular process and product embodiments, it will be appreciated that various alterations, modifications and adaptations may be based on the present disclosure, and are intended to be within the spirit and scope of the present invention as defined by the following claims.

What is claimed is:

1. A method for preparing a flavoring component, said method comprising:
   (1) fermenting protein consisting essentially of a whey source, the whey source selected from the group consisting of dry whey protein concentrate, liquid whey protein concentrate, whey protein isolate, sweet whey, liquid acid whey, dry acid whey, reconstituted whey, whey powder, lactalbumin, whey cheese, and mixtures thereof in the presence of a culture for a period of time sufficient to develop a flavored fermented mixture; and
   (2) heating the flavored fermented mixture to a temperature and for a time sufficient to inactivate the culture and to provide the flavoring component;
   wherein a lipid source is added to the protein before or during the fermentation step (1) or to the flavored fermented mixture prior to the inactivation step (2) in an amount sufficient to preserve the flavor during the inactivation step (2), wherein at least a portion of the lipid source is added to the flavored fermented mixture before the inactivation step (2) and, wherein the flavoring component is separated into a lipid phase which is concentrated in volatile flavor compounds and an aqueous phase and wherein the lipid phase is then used as the flavoring component.

2. The method of claim 1, wherein the culture comprises a lactic acid culture.

3. The method of claim 1, wherein the culture comprises a *Brevibacterium linens* culture or a yeast from the genera *Debaromyces* or *Kluyeromyces*.

4. The method of claim 1, wherein the fermentation step (1) comprises a first fermenting stage wherein the protein is fermented in the presence of a lactic acid culture to provide a first fermented mixture followed by a second fermenting stage wherein the first fermented mixture is fermented in the presence of a *Brevibacterium linens* culture or a yeast from the genera *Debaromyces* or *Kluyeromyces* to provide the flavored fermented mixture.

5. The method of claim 1, wherein the method further comprises fermenting a sulfur-containing substrate.

6. The method of claim 5, wherein the sulfur-containing substrate is selected from the group consisting of L-methionine, L-glutathione, and L-cysteine, and mixtures thereof.

7. The method of claim 1, wherein at least a portion of the lipid source is added to the protein prior to the fermentation step (2).

8. A method for preparing a flavoring component, said method comprising:
   (1) fermenting protein consisting essentially of a whey source, the whey source selected from the group consisting of dry whey protein concentrate, liquid whey protein concentrate, whey protein isolate, sweet whey, liquid acid whey, dry acid whey, reconstituted whey, whey powder, lactalbumin, whey cheese, and mixtures thereof in the presence of a culture for a period of time sufficient to develop a flavored fermented mixture; and
   (2) heating the flavored fermented mixture to a temperature and for a time sufficient to inactivate the culture and to provide the flavoring component;
   wherein a lipid source is added to the protein before or during the fermentation step (1) or to the flavored fermented mixture prior to the inactivation step (2) in an amount sufficient to preserve the flavor during the inactivation step (2), wherein at least a portion of the lipid source is added to the flavored fermented mixture before the inactivation step (2) and, wherein at least a first portion of the lipid source is added to the protein before the fermentation step (1) and a second portion of the lipid source is added to the flavored fermented mixture before the inactivation step (2).

9. The method of claim 1, wherein the lipid source is selected from the group consisting of anhydrous butter oil, butter oil, anhydrous butterfat, cream, and mixtures thereof.

10. The method of claim 2, wherein the culture further comprises a lipase enzyme.

11. The method of claim 4, wherein a lipase enzyme is included in the first fermenting stage.

12. A method for preparing a dairy flavoring component, said method comprising:
   (1) preparing a substrate comprising about 2 to about 30 percent protein, the protein consisting essentially of a whey source, the whey source selected from the group consisting of dry whey protein concentrate, liquid whey protein concentrate, whey protein isolate, sweet whey, liquid acid whey, dry acid whey, reconstituted whey, whey powder, lactalbumin, whey cheese, and mixtures thereof;
(2) fermenting the substrate with a lactic acid culture to provide a flavored fermented mixture;
(3) heating the flavored fermented mixture for a time and a temperature sufficient to inactivate the culture and to provide the flavoring component;
wherein a lipid source in an amount of about 5 to about 50 weight percent of the substrate is added to the substrate before or during the fermentation step (2) or to the flavored fermented mixture prior to the inactivation step (3) to preserve the flavor during the inactivation step (3) and, wherein the flavoring component is separated into a lipid phase which is concentrated in volatile flavor components and an aqueous phase and wherein the lipid phase is then used as the flavoring component.

13. The method of claim 12, wherein the fermentation step (2) comprises a first fermenting stage wherein the substrate is fermented with a lactic acid culture to provide a first fermented mixture and a second fermenting stage wherein the first fermented mixture is fermented with a *Brevibacterium linens* culture or a yeast from the genera *Debaromyces* or *Kluyeromyces* to provide the flavored fermented mixture.

14. The method of claim 12, wherein the fermentation step (2) comprises fermenting the substrate with a *Brevibacterium linens* culture or a yeast from the genera *Debaromyces* or *Kluyeromyces* to provide the flavored fermented mixture.

15. The method of claim 12, wherein the substrate further comprises a sulfur-containing substrate.

16. The method of claim 15, wherein the sulfur-containing substrate is selected from the group consisting of L-methionine, L-glutathione, and L-cysteine, and mixtures thereof.

17. The method of claim 12, wherein at least a portion of the lipid source is added to the substrate prior to the fermentation step (2).

18. The method of claim 13, wherein at least a portion of the lipid source is added to the flavored fermented mixture before the inactivation step (3).

19. The method of claim 12, wherein the lipid source is selected from the group consisting of anhydrous buttermilk, butter oil, anhydrous butterfat, and cream, and mixtures thereof.

20. A creamy-buttery flavor component for use in food products, wherein the creamy-buttery flavor component is prepared by a method comprising (1) fermenting protein consisting essentially of a whey source, the whey source selected from the group consisting of dry whey protein concentrate, liquid whey protein concentrate, whey protein isolate, sweet whey, liquid acid whey, dry acid whey, reconstituted whey, whey powder, lactalbumin, whey cheese, and mixtures thereof in the presence of a culture for a period of time sufficient to provide a flavored fermented mixture, and (2) heating the flavored fermented mixture for a time and a temperature sufficient to inactivate the culture and to provide the creamy-buttery flavor component, wherein a lipid source is added to the protein before or during the fermentation step (1) or to the flavored fermented mixture prior to the inactivation step (2) in an amount sufficient to preserve the flavor during the inactivation step (2), and wherein at least a portion of the lipid source is added to the flavored fermented mixture before the inactivation step (2) and, wherein the flavoring component is separated into a lipid phase which is concentrated in volatile flavor components and an aqueous phase and wherein the lipid phase is then used as the flavoring component.

21. A sulfury-cheddar flavor component for use in food products, wherein the sulfury-cheddar component is prepared by a method comprising (1) fermenting protein consisting essentially of a whey source, the whey source selected from the group consisting of dry whey protein concentrate, liquid whey protein concentrate, whey protein isolate, sweet whey, liquid acid whey, dry acid whey, reconstituted whey, whey powder, lactalbumin, whey cheese, and mixtures thereof in the presence of a first culture in a first stage for a period of time sufficient to develop flavor in a first fermented mixture, (2) fermenting the first fermented mixture in the presence of a *Brevibacterium linens* culture or a yeast from the genera *Debaromyces* or *Kluyeromyces* in a second stage to develop flavor in a second fermented mixture, (3) heating the second fermented mixture for a time and a temperature sufficient to inactivate the first culture and the *Brevibacterium linens* culture or the yeast from the genera *Debaromyces* or *Kluyeromyces* and to provide the sulfury-cheddar flavor component, wherein a lipid source is added to the protein, the first fermented mixture, or the second fermented mixture prior to the inactivation step (3) in an amount sufficient to preserve the flavor during the inactivation step (3), and wherein at least a portion of the lipid source is added to the first fermented mixture or second fermented mixture before the inactivation step and, wherein the flavoring component is separated into a lipid phase which is concentrated in volatile flavor components and an aqueous phase and wherein the lipid phase is then used as the flavoring component.

22. A flavoring system for food products, said system comprising a sulfury-cheddar flavor component and a creamy-buttery component,
wherein the creamy-buttery flavor component is prepared by (1) fermenting protein consisting essentially of a whey source, the whey source selected from the group consisting of dry whey protein concentrate, liquid whey protein concentrate, whey protein isolate, sweet whey, liquid acid whey, dry acid whey, reconstituted whey, whey powder, lactalbumin, whey cheese, and mixtures thereof in the presence of a culture to provide a first flavored fermented mixture and (2) heating the first flavored fermented mixture for a time and a temperature sufficient to inactivate the culture to provide the creamy-buttery flavor component, wherein a first lipid source is added to the first protein or the first fermented mixture prior to the inactivation step (2) in an amount sufficient to preserve the flavor during the inactivation step (2), and wherein at least a portion of the lipid source is added to the first fermented mixture before the inactivation step (2) and, wherein the creamy-buttery flavor component is separated into a lipid phase which is concentrated in volatile flavor components and an aqueous phase and wherein the lipid phase is then used as the creamy-buttery flavoring component; and
wherein the sulfury-cheddar component is prepared by (3) fermenting protein consisting essentially of a whey source, the whey source selected from the group consisting of dry whey protein concentrate, liquid whey protein concentrate, whey protein isolate, sweet whey, liquid acid whey, dry acid whey, reconstituted whey, whey powder, lactalbumin, whey cheese, and mixtures thereof in the presence of a second culture in a first stage to provide a second fermented mixture, (4) fermenting the second fermented mixture in the presence of a *Brevibacterium linens* culture or a yeast from the genera *Debaromyces* or *Kluyeromyces* in a second stage to provide a flavored fermented mixture, and (5) heating the flavored fermented mixture to a time and a temperature sufficient to inactivate the second culture and the *Brevibacterium linens* culture or the yeast from the genera

*Debaromyces* or *Kluyeromyces* to provide the sulfury-cheddary component, wherein a lipid source is added to the protein, the second fermented mixture, the third fermented mixture prior to the inactivation step (5) in an amount sufficient to preserve the flavor during the inactivation step (5), and wherein at least a portion of the lipid source is added to the second fermented mixture or third fermented mixture before the inactivation step (5) and, wherein the sulfury-cheddary component is separated into a lipid phase which is concentrated in volatile flavor components and an aqueous phase and wherein the lipid phase is then used as the sulfury-cheddary flavoring component; and wherein the lipid phase of the sulfury-cheddar component and the lipid phase of the creamy-buttery component of the flavoring system can be incorporated in varying amounts into food products to produce a variety of flavors.

23. A food product flavored with a flavoring system, said flavoring system comprising a sulfury-cheddar component and a creamy-buttery component, wherein the creamy-buttery flavor component is prepared by (1) fermenting protein consisting essentially of a whey source, the a whey source selected from the group consisting of dry whey protein concentrate, liquid whey protein concentrate, whey protein isolate, sweet whey, liquid acid whey, dry acid whey, reconstituted whey, whey powder, lactalbumin, whey cheese, and mixtures thereof in the presence of a first culture to form a first flavored fermented mixture and (2) heating the first flavored fermented mixture to a time and a temperature sufficient to inactivate the first culture and provide the creamy-buttery component, wherein a first lipid source is added to the protein or the first flavored fermented mixture prior to the inactivation step (2) in an amount sufficient to preserve the flavor during the first inactivation step (2), wherein at least a portion of the lipid source is added to the first fermented mixture before the inactivation step (2) and, wherein the creamy-buttery component is separated into a lipid phase which is concentrated in volatile flavor components and an aqueous phase and wherein the lipid phase is then used as the creamy-buttery flavoring component;

wherein the sulfury-cheddar component is prepared by (3) fermenting protein consisting essentially of a whey source, the whey source selected from the group consisting of dry whey protein concentrate, liquid whey protein concentrate, whey protein isolate, sweet whey, liquid acid whey, dry acid whey, reconstituted whey, whey powder, lactalbumin, whey cheese, and mixtures thereof in the presence of a second culture in a first stage to provide a second flavored fermented mixture, (4) fermenting the second flavored fermented mixture in the presence of a *Brevibacterium linens* culture or a yeast from the genera *Debaromyces* or *Kluyeromyces* in a second stage sufficient to provide a third flavored fermented mixture, and (5) heating the third flavored fermented mixture for a time and a temperature sufficient to inactivate the second culture, the *Brevibacterium linens* culture or the yeast from the genera *Debaromyces* or *Kluyeromyces* and provide the sulfury-cheddary component, wherein a second lipid source is added to the protein, the second flavored fermented mixture, or the third flavored fermented mixture prior to the inactivation step (5) in an amount sufficient to preserve the flavor during the inactivation step (5), wherein at least a portion of the lipid source is added to the second fermented mixture or third fermented mixture before the inactivation step (5) and, wherein the sulfury-cheddary component is separated into a lipid phase which is concentrated in volatile flavor components and an aqueous phase and wherein the lipid phase is then used as the sulfury-cheddary flavoring component.

24. The food product of claim 23, wherein the food product comprises about 1 to about 10 weight percent of the flavoring system, and the flavoring system comprises at least about 1 percent of the sulfury-cheddary component and at least 10 percent of the creamy-buttery component.

25. The food product of claim 23, wherein the food product comprises a cheese base.

26. The food product of claim 25, wherein the food product comprises a cheese base selected from the group consisting of process cheese, natural cheese, cream cheese, and cottage cheese.

27. The method of claim 1, wherein at least a portion of the lipid source is added to the flavored fermented mixture before the inactivation step (2).

28. The method of claim 1, wherein the whey source is liquid acid whey.

29. The method of claim 1, wherein the whey source is dried acid whey.

* * * * *